(12) United States Patent
Lemieux

(10) Patent No.: US 8,704,387 B2
(45) Date of Patent: *Apr. 22, 2014

(54) ELECTRICAL ENERGY GENERATOR

(75) Inventor: Aaron Patrick Lemieux, Cleveland, OH (US)

(73) Assignee: Tremont Electric, Inc., Cleveland, OH (US)

( * ) Notice: Subject to any disclaimer, the term of this patent is extended or adjusted under 35 U.S.C. 154(b) by 315 days.

This patent is subject to a terminal disclaimer.

(21) Appl. No.: 12/985,777

(22) Filed: Jan. 6, 2011

(65) Prior Publication Data

US 2011/0193427 A1    Aug. 11, 2011

Related U.S. Application Data

(60) Provisional application No. 61/292,836, filed on Jan. 6, 2010.

(51) Int. Cl.
*H02K 35/02* (2006.01)

(52) U.S. Cl.
USPC .............................................. 290/1 R; 310/25

(58) Field of Classification Search
None
See application file for complete search history.

(56) References Cited

U.S. PATENT DOCUMENTS

| | | |
|---|---|---|
| 1,275,514 A | 8/1918 | Wolak |
| 3,100,292 A | 8/1963 | Warner, Jr., et al. |
| 3,103,603 A | 9/1963 | Reutter |
| 3,129,347 A | 4/1964 | Tognola |
| 3,463,946 A | 8/1969 | Zimmerman |
| 3,465,161 A | 9/1969 | Cutkosky |
| 3,483,759 A | 12/1969 | O'Sullivan, Jr., et al. |
| 3,553,726 A | 1/1971 | Zimmerman |
| 3,633,053 A | 1/1972 | Peters |
| 3,746,937 A | 7/1973 | Koike |
| 3,963,948 A | 6/1976 | Bratkowski et al. |
| 3,980,908 A | 9/1976 | McClintock |
| 3,984,707 A | 10/1976 | McClintock |
| 4,158,811 A | 6/1979 | Li et al. |
| 4,220,907 A | 9/1980 | Pappas |
| 4,249,096 A | 2/1981 | Hickox |

(Continued)

FOREIGN PATENT DOCUMENTS

| | | |
|---|---|---|
| CN | 276857 Y | 3/2006 |
| CN | 1776290 A | 5/2006 |

(Continued)

OTHER PUBLICATIONS

Office Action from the United States Patent and Trademark Office, mailing date Feb. 3, 2011 for U.S. Appl. No. 12/399,448.

(Continued)

*Primary Examiner* — Tulsidas C Patel
*Assistant Examiner* — Sean Gugger
(74) *Attorney, Agent, or Firm* — Curatolo Sidoti Co., LPA; Salvatore A. Sidoti; Vincent A. Cortese

(57) ABSTRACT

An electrical energy generator comprising a housing having a longitudinal axis and opposite ends, an electromagnetically active mass positioned within the housing reciprocally movable along at least a portion of the longitudinal axis, an electrically conductive material within the housing, a body engaged with the electromagnetically active mass, and at least one spring positioned between at least one of an end of the housing and an end of the body, or between an end of the body and the electrically conductive material.

24 Claims, 6 Drawing Sheets

(56) References Cited

U.S. PATENT DOCUMENTS

| | | | |
|---|---|---|---|
| 4,315,197 A | 2/1982 | Studer | |
| 4,342,920 A | 8/1982 | Bucknam | |
| 4,399,368 A | 8/1983 | Bucknam | |
| 4,454,426 A | 6/1984 | Benson | |
| 4,473,751 A | 9/1984 | Rombach et al. | |
| 4,484,082 A | 11/1984 | Bucknam | |
| 4,583,027 A | 4/1986 | Parker et al. | |
| 4,649,283 A | 3/1987 | Berchowitz et al. | |
| 4,754,644 A | 7/1988 | Valentini | |
| 4,924,123 A | 5/1990 | Hamajima | |
| 5,347,186 A | 9/1994 | Konotchick | |
| 5,434,549 A | 7/1995 | Hirabayashi et al. | |
| 5,503,314 A | 4/1996 | Fiscus | |
| 5,564,612 A | 10/1996 | Gregory | |
| 5,578,877 A | 11/1996 | Tieman | |
| 5,723,789 A | 3/1998 | Shannon | |
| 5,762,243 A | 6/1998 | McMaster et al. | |
| 5,762,251 A | 6/1998 | Gleason | |
| 5,818,132 A | 10/1998 | Konotchick | |
| 5,904,282 A | 5/1999 | Gleason | |
| 5,965,964 A | 10/1999 | Skinner et al. | |
| 5,975,714 A * | 11/1999 | Vetorino et al. | 362/192 |
| 6,142,395 A | 11/2000 | Reiter | |
| 6,170,767 B1 | 1/2001 | Herold et al. | |
| 6,218,921 B1 | 4/2001 | Eberts et al. | |
| 6,236,123 B1 | 5/2001 | Pinkerton | |
| 6,619,523 B1 | 9/2003 | Duckworth | |
| 6,637,631 B2 | 10/2003 | Lafoux et al. | |
| 6,705,085 B1 | 3/2004 | Braithwaite et al. | |
| 6,770,988 B2 | 8/2004 | Denne | |
| 6,809,427 B2 | 10/2004 | Cheung et al. | |
| 6,809,434 B1 | 10/2004 | Duncan et al. | |
| 6,812,583 B2 | 11/2004 | Cheung et al. | |
| 6,812,597 B2 | 11/2004 | McGill et al. | |
| 6,815,847 B2 | 11/2004 | Duncan et al. | |
| 6,853,103 B2 | 2/2005 | Moriyasu | |
| 6,864,647 B2 | 3/2005 | Duncan et al. | |
| 6,873,067 B2 | 3/2005 | Ichii et al. | |
| 6,914,351 B2 | 7/2005 | Chertok | |
| 6,936,937 B2 | 8/2005 | Tu et al. | |
| 6,952,060 B2 | 10/2005 | Goldner et al. | |
| 6,958,553 B2 * | 10/2005 | Ichii et al. | 310/15 |
| 6,982,497 B2 | 1/2006 | Rome | |
| 7,015,613 B2 | 3/2006 | Lilie et al. | |
| 7,064,461 B2 | 6/2006 | Razzaghi | |
| 7,124,720 B2 | 10/2006 | Liang et al. | |
| 7,132,597 B2 | 11/2006 | Hosler | |
| 7,148,583 B1 | 12/2006 | Shau et al. | |
| 7,249,579 B2 | 7/2007 | Liang et al. | |
| 7,285,878 B2 | 10/2007 | McGill et al. | |
| 7,288,860 B2 | 10/2007 | Cheung et al. | |
| 7,345,372 B2 | 3/2008 | Roberts et al. | |
| 7,439,641 B2 | 10/2008 | Ogino et al. | |
| 7,474,018 B2 | 1/2009 | Shimizu et al. | |
| 7,498,682 B2 | 3/2009 | Lemieux | |
| 7,692,320 B2 | 4/2010 | Lemieux | |
| 7,712,174 B2 | 5/2010 | Shimizu et al. | |
| 2003/0155771 A1 | 8/2003 | Cheung et al. | |
| 2004/0100100 A1 | 5/2004 | Wilson | |
| 2004/0104625 A1 | 6/2004 | Wakuda et al. | |
| 2004/0150277 A1 | 8/2004 | Moriyasu | |
| 2004/0155467 A1 | 8/2004 | Cheung et al. | |
| 2004/0222637 A1 | 11/2004 | Bednyak | |
| 2004/0222638 A1 | 11/2004 | Bednyak | |
| 2004/0251748 A1 | 12/2004 | Inagaki et al. | |
| 2004/0251750 A1 | 12/2004 | Cheung et al. | |
| 2005/0211199 A1 | 9/2005 | Liang et al. | |
| 2005/0211200 A1 | 9/2005 | Liang et al. | |
| 2005/0279300 A1 | 12/2005 | Liang et al. | |
| 2006/0192386 A1 | 8/2006 | Rome | |
| 2007/0040457 A1 * | 2/2007 | Shimizu et al. | 310/15 |
| 2007/0131185 A1 | 6/2007 | Liang et al. | |
| 2007/0158946 A1 | 7/2007 | Annen et al. | |
| 2007/0158947 A1 | 7/2007 | Annen et al. | |
| 2007/0210580 A1 | 9/2007 | Roberts et al. | |
| 2008/0036303 A1 | 2/2008 | Stevens | |
| 2008/0074083 A1 | 3/2008 | Yarger et al. | |
| 2008/0174187 A1 | 7/2008 | Erixon et al. | |
| 2008/0217926 A1 | 9/2008 | Lemieux | |
| 2008/0284258 A1 | 11/2008 | Spratte et al. | |
| 2009/0051229 A1 | 2/2009 | Shau | |
| 2009/0058201 A1 | 3/2009 | Brennvall | |
| 2009/0121493 A1 | 5/2009 | Lemieux | |
| 2009/0121494 A1 | 5/2009 | Lemieux | |
| 2009/0146508 A1 | 6/2009 | Peng et al. | |
| 2009/0278358 A1 | 11/2009 | Lemieux | |
| 2009/0295253 A1 | 12/2009 | Yarger et al. | |
| 2009/0295520 A1 | 12/2009 | Yarger et al. | |
| 2011/0193428 A1 * | 8/2011 | Lemieux | 310/25 |

FOREIGN PATENT DOCUMENTS

| | | |
|---|---|---|
| CN | 2906123 Y | 5/2007 |
| JP | 7-9081 | 2/1995 |
| JP | 2002-374661 | 12/2002 |
| JP | 2005-94832 | 4/2005 |
| JP | 2006-166694 | 6/2006 |
| KR | 10-2006-0003092 | 1/2006 |
| KR | 10-2006-0009329 | 1/2006 |
| UA | 19437 U | 12/2006 |

OTHER PUBLICATIONS

Office Action from China Patent Office issued Mar. 15, 2011 for China Patent Application No. 20080015188X.

English language abstract and machine translation of JP 2005-94832; Publication Date: Apr. 7, 2005; Applicant: Sony Corp.

International Search Report and Written Opinion, for PCT International Patent Application No. PCT/US2011/020361 corresponding to U.S. Appl. No. 12/985,777.

International Search Report and Written Opinion, for PCT International Patent Application No. PCT/US2011/020363 corresponding to U.S. Appl. No. 12/985,811.

* cited by examiner

ELECTRICAL ENERGY GENERATOR

This application claims the benefit of the filing date, under 35 U.S.C. §119(e), of U.S. Provisional Application for Patent Ser. No. 61/292,836, filed on Jan. 6, 2010.

A device for harvesting mechanical energy generated by a moving mass and converting the harvested mechanical energy into usable electrical energy is disclosed. The device permits the harvest of mechanical energy imparted to the device from movement, such as human gait activities, and the conversion of the harvested mechanical energy into electrical energy.

Mechanical energy comprises a number of forms of energy including, but not limited to kinetic energy. Mechanical energy is manifested in the bodies of humans and animals as a result of their physical processes. Such physical processes include voluntary body movements. Amongst voluntary body movements are gait processes. Gait activities include stepping, walking, running, climbing, jumping, and similar activities. Other voluntary body movements include grasping, reaching, shaking, swinging, stretching, etc. All voluntary body movements are manifested as motion of body members having mass so that all voluntary motor activities develop kinetic energy. Further, voluntary motor activities may impart kinetic energy to peripheral masses engaged with a moving body.

It is sometimes desirable to convert mechanical energy to electrical energy. An example is the conversion of kinetic energy into electrical energy as the kinetic energy of a mass moves a magnetic field relative to a conductive coil thereby converting the kinetic energy of the mass to electrical energy by action of electromagnetic induction.

Devices to convert the kinetic energy manifested in the bodies and peripheral masses engaged with the bodies of humans as a result of their physical processes into electrical energy are not well-developed. Accordingly, it is desirable to provide a device to harvest kinetic energy imparted by voluntary motor activities and convert the harvested mechanical energy into electrical energy.

Embodiments of the subject matter are disclosed with reference to the accompanying drawings and are for illustrative purposes only. The subject matter is not limited in its application to the details of construction or the arrangement of the components illustrated in the drawings.

Figure 1:
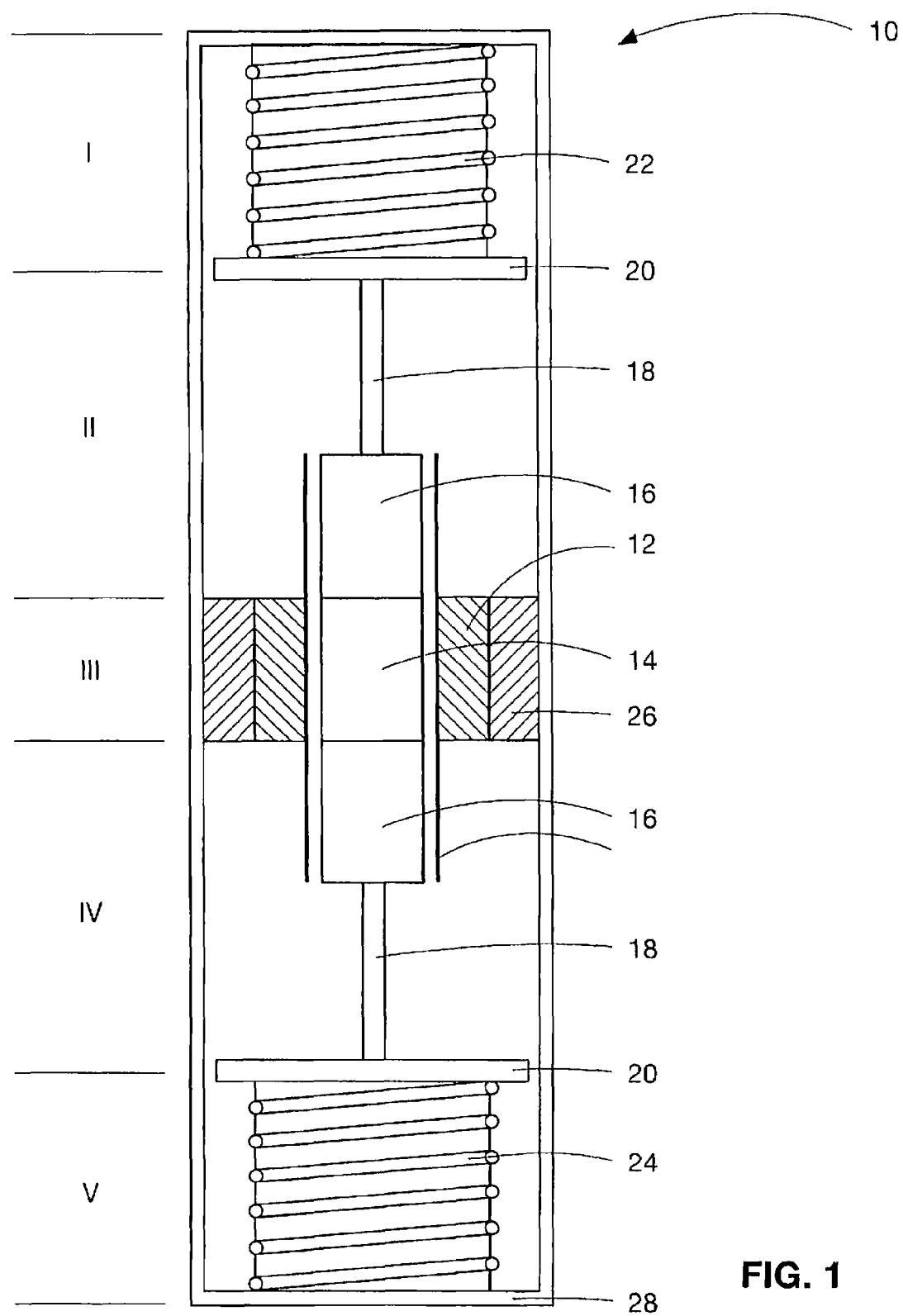
FIG. 1 is a cross-section view of one illustrative embodiment of the electrical energy generator.

Kinetic energy is manifested in the bodies of animals and humans, as a result of different voluntary motor activities. Voluntary motor activities include, for example, gait processes, leg movements, arm movements, head movements, torso movements, and the like. Kinetic energy is also manifested in the objects or masses that are moved by a human or animal in the course of transporting them. Some voluntary motor activities, such as human walking gait, are rhythmic activities which have a predictable frequency or periodicity. In the case of human walking gait, the predictable frequency is approximately 2 Hz.

An electrical energy generator for harvesting kinetic energy and converting the harvested kinetic energy developed or imparted by voluntary motor activities into electrical energy is provided. The electrical energy generator generally comprises a housing, an electrically conductive material, an electromagnetically active mass movable in a reciprocating manner relative to the housing, and at least one spring positioned within the housing. A benefit is realized by maximizing the mass of the electromagnetically active mass. This may be achieved by integrating magnetic or non-magnetic components having mass into the electromagnetically active mass.

According to certain illustrative embodiments, the electrical energy generator comprises a housing having a longitudinal axis and opposite ends, an electromagnetically active mass positioned within the housing reciprocally movable along at least a portion of the longitudinal axis, an electrically conductive material within the housing, at least one spring stop engaged with the electromagnetically active mass, and at least one spring positioned between an end of the housing and the at least one spring stop.

According to additional illustrative embodiments, the electrical energy generator comprises a housing having a longitudinal axis and opposite ends, an electromagnetically active mass positioned within the housing reciprocally movable along at least a portion of the longitudinal axis, an electrically conductive material within the housing, at least one spring stop engaged with the electromagnetically active mass, and at least one spring positioned between the spring stop and the electrically conductive material.

According to further illustrative embodiments, the electrical energy generator comprises a housing having a longitudinal axis and opposite ends, an electromagnetically active mass positioned within the housing reciprocally movable along at least a portion of the longitudinal axis, an electrically conductive material within the housing, at least one spring stop engaged with the electromagnetically active mass, and at least one spring positioned between the spring stop and the end of the housing and between the spring stop and the electrically conductive material.

According to further illustrative embodiments, the electrical energy generator comprises a housing having a longitudinal axis and opposite ends, an electromagnetically active mass positioned within the housing reciprocally movable along at least a portion of the longitudinal axis, an electrically conductive material within the housing, first and second spring stops engaged with the electromagnetically active mass, and at least one spring positioned between first end of the housing and the first spring stop and at least one spring positioned between a second end of the housing and a second spring stop.

According to further illustrative embodiments, the electrical energy generator comprises a housing having a longitudinal axis and opposite first and second ends, an electromagnetically active mass positioned within the housing reciprocally movable along at least a portion of the longitudinal axis, an electrically conductive material within the housing, first and second spring stops engaged with the electromagnetically active mass, at least one spring positioned between the first end of the housing and the first spring stop, at least one spring positioned between the second end of the housing and a second spring stop, at least one spring positioned between the first spring stop and the electrically conductive material, and at least one spring positioned between the second spring stop and the electrically conductive material.

According to certain illustrative embodiments, the electrical energy generator generally comprises a housing having a longitudinal axis and opposite ends, an electromagnetically active mass positioned within the housing reciprocally movable along at least a portion of the longitudinal axis, an electrically conductive material within the housing, a body engaged with the electromagnetically active mass, the body having a shaft portion, at least one spring stop portion, and opposite ends, and at least one spring positioned between at least one of an end of the housing and the body.

According to certain illustrative embodiments, the electrical energy generator generally comprises a housing having a longitudinal axis and opposite ends, an electromagnetically active mass positioned within the housing reciprocally movable along at least a portion of the longitudinal axis, an electrically conductive material within the housing and positioned about the electromagnetically active mass, a body engaged with the electromagnetically active mass, the body having a shaft portion, at least one spring stop portion, and opposite ends, and at least one spring positioned between the body and the electrically conductive material.

According to certain illustrative embodiments, the electrical energy generator generally comprises a housing having a longitudinal axis and opposite ends, an electromagnetically active mass positioned within the housing reciprocally movable along at least a portion of the longitudinal axis, an electrically conductive material within the housing and positioned about the electromagnetically active mass, a body engaged with the electromagnetically active mass, the body having a shaft portion, at least one spring stop portion, and opposite ends, and at least one spring positioned between at least one of an end of the housing and an end of the body and between an end of the body and the electrically conductive material.

According to further illustrative embodiments, the electrical energy generator comprises a housing having a longitudinal axis and opposite ends, an electromagnetically active mass positioned within the housing reciprocally movable along at least a portion of the longitudinal axis, an electrically conductive material within the housing, a body engaged with the electromagnetically active mass, the body having a shaft portion, at least one spring stop portion, and opposite ends, a first spring positioned between a first end of the housing and first spring stop, a second spring positioned between the body and the electrically conductive material, a third spring positioned between a second end of the housing and a second spring stop, and a fourth spring positioned between the second spring stop and the electrically conductive material. The springs that are positioned between the ends of the housing and the spring stops may have a nonlinear spring coefficient.

According to additional illustrative embodiments, the electrical energy generator may include a combination of one or more means for constraining the non-reciprocating movement of the electromagnetically active mass within the housing, and/or means for mitigating motion retardation of the electromagnetically active mass within the housing, and/or at least one spring deflection adjustor.

The device harvests mechanical energy and converts the harvested mechanical energy into electrical energy. By harvesting mechanical energy from the reciprocating mass and converting it into electrical energy, the device acts as an electrical generator. The device thus harvests mechanical energy and outputs electrical energy. The electrical energy may be used for sensing a vibration or shock (impulse), for recharging and operating devices autonomously, or for utility scale electrical power.

The generated electrical energy may be used to power a wide variety of electronic devices including, without limitation, locators, signaling equipment, entertainment equipment, energy storage equipment, radio receivers, radio transmitters, wireless telephones, cameras, global positioning system (GPS) equipment, and other like electronic devices.

The electrical energy generated by the device may be low frequency AC power. When low frequency AC power is generated by the device, rectification is utilized to convert the AC power into usable DC power. An inductor or transformer may also be used on the output prior to rectification.

An energy storage device may be used after rectification of the generated electrical power. Any suitable energy storage device may be used in the device, such as, without limitation, one or more capacitors or batteries. The energy storage device may be used to store the energy converted by the circuit for storage or for transfer to another device.

The device may further include a power conditioning circuit. Without limitation, and only by way of illustration, suitable power conditioning units may include linear regulators, AC-DC systems, AC-DC-AC systems, switch mode power supplies (SMPS), and the like.

The housing of the device may comprise any suitable structure, capsule, container, or vessel that is capable of enclosing the other components of the electrical energy generator. Without limitation, according to certain embodiments, the housing comprises an elongated cylinder or tube having an interior cavity or volume.

The housing may be constructed of any material that can support the engagement of device components and that does not interfere with the harvest of mechanical energy or conversion of the mechanical energy into electrical energy. Without limitation, suitable material that may be used to construct the housing of the device comprises metal, metal alloys, plastic, glass, composite materials, or combinations thereof.

The housing may be provided as an open container, such that the interior of the housing is in communication with the external environment surrounding the housing. According to embodiments in which the housing is open, the means of communication with the environment surrounding the housing may include one or more apertures, holes, vents, slots, perforations, or like structure located within the wall of the housing, thereby providing communication between the interior cavity of the housing and the external environment. In such open embodiments, the housing atmosphere is generally substantially identical to the surrounding environmental atmosphere.

According to other embodiments, the housing comprises a closed structure such that the interior of the housing is substantially isolated from the environment surrounding the housing. According to embodiments including a closed housing, the housing atmosphere need not be substantially identical to the surrounding external environmental atmosphere. For example, without limitation, the housing atmosphere may comprise air, nitrogen, a Nobel gas, mineral oil, vegetable oil, water, saline, partial vacuum, substantial vacuum, a ferrofluid, or combinations thereof.

The device may be provided with an additional housing to minimize or prevent contaminants from entering the system. The pressure of the atmosphere between the first generator housing and the second generator housing may be positive, negative, or equal to the atmosphere outside of the additional generator housing.

The electrical energy generator comprises an electromagnetically active mass. As used herein, "electromagnetically active" refers to a mass that is capable of affecting a magnetic field. Electromagnetically active components include, but are not limited to, permanent magnets, electromagnets, inductors, and materials having magnetic permeability. The electrical energy generator may comprise one or more electromagnetically active components to affect a desired magnetic field.

An electromagnetically active mass may be any electromagnetically active component which also has mass. An electromagnetically active mass is capable of producing a magnetic field or bending the flux lines of a magnetic field. Electromagnetically active masses capable of producing a magnetic field comprise permanent magnets, electromagnets and the like. Electromagnetically active masses capable of bending the flux lines of a magnetic field may also comprise materials having magnetic permeability. In certain embodiments, the materials having magnetic permeability are materials which have a high permeability. Without limitation, materials which have a high permeability comprise iron, nickel, chromium, and like materials. In certain embodiments, an electromagnetically active mass may comprise metal, metal alloys, ceramics, and mixtures thereof.

The electromagnetically active mass is positioned within the housing. The manner of positioning within the housing of the electromagnetically active mass allows the electromagnetically active mass to move in a reciprocating manner with respect to the housing. The electromagnetically active mass defines a volume which is swept out by the electromagnetically active mass as it moves. The volume which is swept out by the electromagnetically active mass as it moves is at least a portion of the volume of the interior cavity of the housing.

The shape of the electromagnetically active mass can vary greatly, and there is no particular shape to which the electromagnetically active mass must be limited. In certain embodiments, the electromagnetically active mass comprises an axisymmetric shape. In certain embodiments, the electromagnetically active mass comprises a substantially cylindrical shape. When the housing has a cylindrical shape, the outer circumference of the cylinder is less than the inner circumference of the housing.

In certain embodiments, the electromagnetically active mass comprises at least one hole extending longitudinally from a first end surface through a second end surface of the mass. In certain embodiments, the electromagnetically active mass comprises a substantially cylindrical axisymmetric mass comprising a hole extending from a first end through to a second end of the mass. The hole may be centrally located in the mass.

The device may include a guide means. A guide means comprises any component that has a guidance surface for the electromagnetically active mass over at least a portion of the path described by the mass as it moves. In certain embodiments, the material of the guidance means comprises metal, plastic, glass, composite materials, or combinations thereof. In certain embodiments the guidance surface of the guidance means comprises a surface coating. The surface coating may comprise metal, plastic, glass, composite materials, or combinations thereof. In certain embodiments the guidance means, or the guidance surface of the guidance means, may comprise PTFE, PEEK, or oil-impregnated bronze.

According to certain embodiments, the guidance means guides the mass by providing restorative forces to the mass in directions substantially normal to the surface of the means in response to contact between the mass and the means. These restorative forces are referred to as "normal forces". By providing such restorative forces, the guidance means impedes motion of the mass in directions normal to the means. In certain embodiments, the mass may be engaged with the guidance means during all portions of the motion of the mass. In certain embodiments, the mass is constrained by the guidance means to minimize substantially all motion of the mass other than linear reciprocation, such that motion of the mass is limited to substantially linear reciprocation. There will exist a coefficient of friction determined by the material of the guidance surface and the material of the electromagnetically active mass which contacts the material of the guidance surface. The product of the coefficient of friction and the normal forces defines the magnitude of friction forces between the mass and the means which retard the motion of the mass. In certain embodiments, the coefficient of friction is selected to be very low in order to minimize the magnitude of friction forces.

In certain embodiments, in which the electromagnetically active mass comprises at least one hole communicating from a first end surface to a second end surface, the guide means comprises an elongated shaft or rod passing through the at least one hole and engaged with the spring stops or with ends of the housing, and along which the electromagnetically active mass moves as it reciprocates.

The device includes an electrically conductive material within the housing. The electrically conductive material may be engaged with the inner surface of the housing such that the electromagnetically active mass may pass through the electrically conductive material without coming into contact with it. Without limitation, the electrically conductive material may be provided in the form of an induction coil. The induction coil may include an armature, inductor, wire coil, or any other looped electrically conductive material. A change in a local magnetic field produces a current within and a potential across an induction coil. Because the induction coil is positioned about the electromagnetically active mass, a change in position of the electromagnetically active mass within a magnetic field of the induction coil produces a current within and a potential across the induction coil. The electrically conductive material may comprise one or more induction coils. When more than one induction coil is used, the plurality of induction coils may be placed adjacent to one another along a portion of the longitudinal axis of the generator housing or the plurality of induction coils may be positioned on the inner surfaces of the generator housing in a spaced-apart fashion along at least a portion of the longitudinal axis of the generator housing.

The electrical energy generator includes a body that is engaged with the electromagnetically active mass. The body includes a shaft portion and a spring stop portion. The shaft portion may be of any size and shape which is suitable to add additional mass to the electromagnetically active mass and which is capable of engaging the electromagnetically active mass to the spring stop portion of the body. The shaft portion may connect the spring stop portion of the body to the electromagnetically active mass. Without limitation, the connection of the shaft to the electromagnetically active mass may be achieved by bonding methods such as adhesives, brazing, magnetic forces, or welding, or by mechanical joining methods such as press fitting or threading. Without limitation, the shaft portion my be substantially cylindrical, and may comprise a through hole in order to engage guidance means. Without limitation, at least a portion of the shaft portion of the body may comprise an electromagnetically active material as described herein. Without limitation, the shaft portion may be integral with the electromagnetically active mass and/or the spring stop portion of the body. Alternatively, the shaft portion may be a separate piece that is joined to the spring stop portion of the body.

The spring stop portion of the body may be of any size and shape suitable to engage the electromagnetically active mass and body with the at least one spring. Without limitation, the spring stop portion may be adapted to constrain the movement of the electromagnetically active mass to minimize or substantially prevent non-reciprocating motion of the electromagnetically active mass within the housing. Without limitation, the spring stop portion may be adapted to minimize motion retardation during movement of the electromagnetically active mass and body within the housing. The spring stop portion of the body may be adapted to rotate relative to the body as the at least one spring experiences compression or extension.

The spring stop portion also imparts additional mass to the electromagnetically active mass. Without being bound to any particular theory, increasing the total mass of the electromagnetically active mass and support structure increases the effectiveness of the electrical energy generator due to the increased momentum provided by the increased movable mass within the housing.

The device includes at least one spring positioned within the housing. As used herein, a "spring" is any element which produces a restorative force in response to its displacement. Certain springs produce restorative forces directly proportional to their displacement. Springs which produce restorative forces directly proportional to their displacement are springs which obey Hooke's Law. A spring accumulates mechanical energy in the form of potential energy as work is done upon it and releases it as the above-referenced restorative force. The relationship between the restorative force and the displacement is the spring coefficient. In springs which obey Hooke's Law, the spring coefficient is substantially constant.

Certain other springs produce restorative forces which are not directly proportional to their displacement. These springs do not obey Hooke's law, and can be utilized to provide differential forces with respect to displacement in order to provide greater or lesser restorative forces.

According to certain illustrative embodiments, the electrical energy generator includes at least one spring that obeys Hooke's Law. When the electrical energy generator comprises at least two springs and the springs substantially obey Hooke's Law, the spring/mass system is considered to be a harmonic oscillator and can provide a natural frequency. In certain circumstances, however, it may be advantageous to utilize springs that possess stiffening spring characteristics such that at the end of travel, there would be no need to incorporate any rebound means with the device.

The springs that may be included in the device may include extension springs, compression springs, torsion, Bellville springs, elastic material, or any combination of these different types of springs. In certain embodiments, the spring(s) included in the electrical energy generator comprise coil springs. A coil spring is a type of torsion spring. A coil spring comprises an elastic material formed into a helix, or spiral, or spiral helix having two opposite ends. The coil springs may comprise either compression springs or extension springs.

A spring pre-load is a load that exists in the spring prior to deflection of the spring from some initial state. As used herein, pre-load of a spring refers to the load in the spring in the unexcited device in which the electromagnetically active mass is at rest. The device may also include a suitable means for adjusting the deflection or spring pre-load on the coil springs. A means of adjusting spring pre-load comprises any component which introduces or removes a load, tension or compression of an installed spring, usually in the unexcited device. Introduction or removal of a load of an installed spring may be done by adjusting the deflection of the spring. In certain embodiments the means of adjusting spring pre-load and deflection comprises a movable member with which the spring is engaged to have its pre-load and deflection adjusted. In such embodiments, the region of engagement between the spring and the member is movable with respect to the housing. In certain embodiments, the moveable member comprises a threaded member. Threaded members may comprise screws, bolts, or threaded bushings. In certain embodiments the threaded member is engaged with a counterpart threaded receiver that is substantially fixed to or integral to the housing. One illustrative method of moving the point of engagement between the spring and the threaded member with respect to the housing is by advancement or retraction of the threaded member by rotating the threaded member with respect to the threaded receiver. As the threaded member is rotated, the threaded member and the region of engagement between the spring and the member moves helically with respect to the threaded receiver, and thereby moves helically with respect to the housing. The amount of movement will be equal to the product of the thread pitch and the number of rotations made. The amount of change in the load will be equal to the product of the amount of movement and the spring coefficient.

In certain embodiments, the at least one spring may be pre-compressed, meaning that the spring(s) will be positioned within the housing such that, when the housing is at rest and the electromagnetically active mass is substantially still, the spring(s) will be in a state of compression. This pre-compression will reduce losses in the forces associated with the electromagnetically active mass when the mass is in motion.

The electrical energy generator may further comprise a means of mitigating motion retardation of the electromagnetically active mass by the housing atmosphere. The housing atmosphere may comprise a fluid, wherein such fluid may be a gas or a liquid. Fluids are known to retard the motion of materials through them. In certain circumstances, the housing atmosphere will retard the motion of the electromagnetically active mass through the housing atmosphere. One type of retardation of the motion of the electromagnetically active mass is by viscous effects. Viscous effects which retard motion appear whenever a body moves through a fluid having a positive viscosity. One means of mitigating motion retardation by viscous effects is by rarification or evacuation of the housing atmosphere. In certain embodiments, the housing atmosphere comprises a gas at sub-atmospheric pressure, such that the housing atmosphere is reduced, rarified, or evacuated to the point that it comprises a partial or substantial vacuum.

Retardation of the motion of the electromagnetically active mass may occur by pressure differentials. Pressure differentials may be created by motion of an object within, and in close clearance to, a closed housing. In certain embodiments, the electromagnetically active mass may be engaged in very close tolerance to an electrically conductive material. One means of mitigating motion retardation by pressure differentials is by the inclusion of apertures, flow-paths, flutes, or ducts to permit flow from the region into which the mass is moving and to the region from which the mass is moving. In certain embodiments, the interior surface of the electrically conductive material or any guidance means which may be utilized may comprise longitudinal flutes to permit flow of the fluid comprising the housing atmosphere from one region or the interior cavity to another region of the interior cavity. In certain embodiments the electromagnetically active mass may comprise one or more through-holes or flutes which permit flow of the fluid comprising the housing atmosphere around, across, or through the mass.

As the housing of the generator may include one or more holes to allow the atmosphere inside the generator housing to communicate with the atmosphere outside the generator housing, the spring stops may also include one or more holes to allow the atmosphere from certain regions of the inside of the generator housing to flow into other regions inside the generator housing with as little restriction as possible.

According to certain embodiments, the electrical energy generator may further comprise an electromagnetically active shroud that is engaged with the housing and at least partially covering the electrically conductive material. In certain embodiments, the electrical energy generator comprises an electromagnetically active shroud that is engaged with the housing which at least partially covers said housing. In certain embodiments the electrical energy generator may comprise an electromagnetically active shroud that is engaged with the housing which fully covers said housing. In certain embodiments the electromagnetically active shroud may comprise a permanent magnet. In certain embodiments, the electromagnetically active shroud comprises an unmagnetized material having magnetic permeability. In embodiments in which the electromagnetically active mass comprises an unmagnetized material having magnetic permeability, the device will further comprise an electromagnetically active shroud which comprises a permanent magnet. In certain embodiments in which the electromagnetically active mass comprises a permanent magnet, the device comprises an electromagnetically active shroud comprising an unmagnetized material having magnetic permeability.

The electrical energy generator comprises an electromagnetically active mass which reciprocates within the housing. Exciting forces acting on the housing excite the mass causing it to move within the housing in a reciprocating manner which is substantially harmonic. Further, the electrical energy generator comprises components which remove mechanical energy from the mass when it is in motion, thereby electromagnetically damping it. Because of these properties, certain embodiments of the electrical energy generator may be described as a substantially harmonic damped oscillator. It should be noted that the damping of the energy from the mass may comprise critically damping, greater than critically damping or less than critically damping. According to certain illustrative embodiments, the damping of the energy from the mass comprises less than critical damping. According to yet further embodiments, the damping of the energy of the mass may be variable.

When a driving force is acting on the electrical energy generator, according to certain embodiments, the device behaves as a substantially harmonic driven, damped oscillator. Harmonic oscillators have a fundamental or natural frequency which is a function of oscillating mass and spring coefficient. Because the mass of the electromagnetically active mass is determinable and because the spring coefficient of the spring is determinable, the natural frequency of the device is also determinable. The selection of the mass or spring coefficient or both to adjust the natural frequency of the device is referred to herein as "tuning". That is, the natural frequency of the device may be tuned by selection of the mass or the spring coefficient or both.

Because the mass, by definition, has inertia, an exciting force directed to the device along a direction which is not perpendicular to the axis of reciprocation, causes the housing to be displaced to a greater extent than the mass is caused to be displaced. This difference in displacement causes some of the exciting kinetic energy imparted by the action of the exciting force acting over said displacement to be absorbed by the electromagnetically active mass, the spring(s) and the electrically conductive material.

Because the electrical energy generator includes an electromagnetically active mass, a spring, and an electrically conductive material, when set into motion, the device can behave as a damped vibrating system and will vibrate until it dissipates the exciting energy. The natural frequency or frequencies of the harvester can be predetermined. Without limitation, in certain embodiments, the electrical energy generator behaves as a substantially harmonic oscillator having one natural frequency. The level of damping in the device can be predetermined.

The certain illustrative embodiments of the device will be described in further detail with respect to the Figures. The electrical energy generator should not be limited to the illustrative embodiments depicted by the Figures.

As shown in FIG. 1, the device 10, shown at a state of rest, comprises a housing 28 which comprises an elongated circular cross-section tube having first and second ends. The housing 28 comprises an internal cavity defined by the tube and is divided into regions I, II, III, IV, and V. The device 10 further comprises an electromagnetically active mass 14 which is engaged with a body having two shaft portions 18 and two spring stop portions 20. Additional mass 16 may be magnetic or non-magnetic material. The electromagnetically active mass 14, 16 and body form a unitary mass which is moveable within said housing 28. The electromagnetically active mass 14 moves in a reciprocating manner along a path through an induction coil 12, 26 which is positioned about the electromagnetically active mass 14. The device further comprises a first spring 22 having a first end and a second end. Spring 22 comprises a coil spring having the first end engaged with the first end portion of the housing 28 and the second end engaged with the spring stop 20. The device further comprises a second spring 24 having a first end and a second end. Spring 24 comprises a coil spring having the first end engaged with to the first end portion of the housing 28 and the second end engaged with the spring stop 20. Movement of electromagnetically active mass 14 and body relative to the housing 28 causes motion of the spring-stop engaged second end of each spring 22, 24 with respect to said housing-engaged first end of each spring 22, 24 such that the motion of the electromagnetically active mass 14 relative to the induction coil 12, 26 results in deflection of the springs 22, 24.

Figure 2:
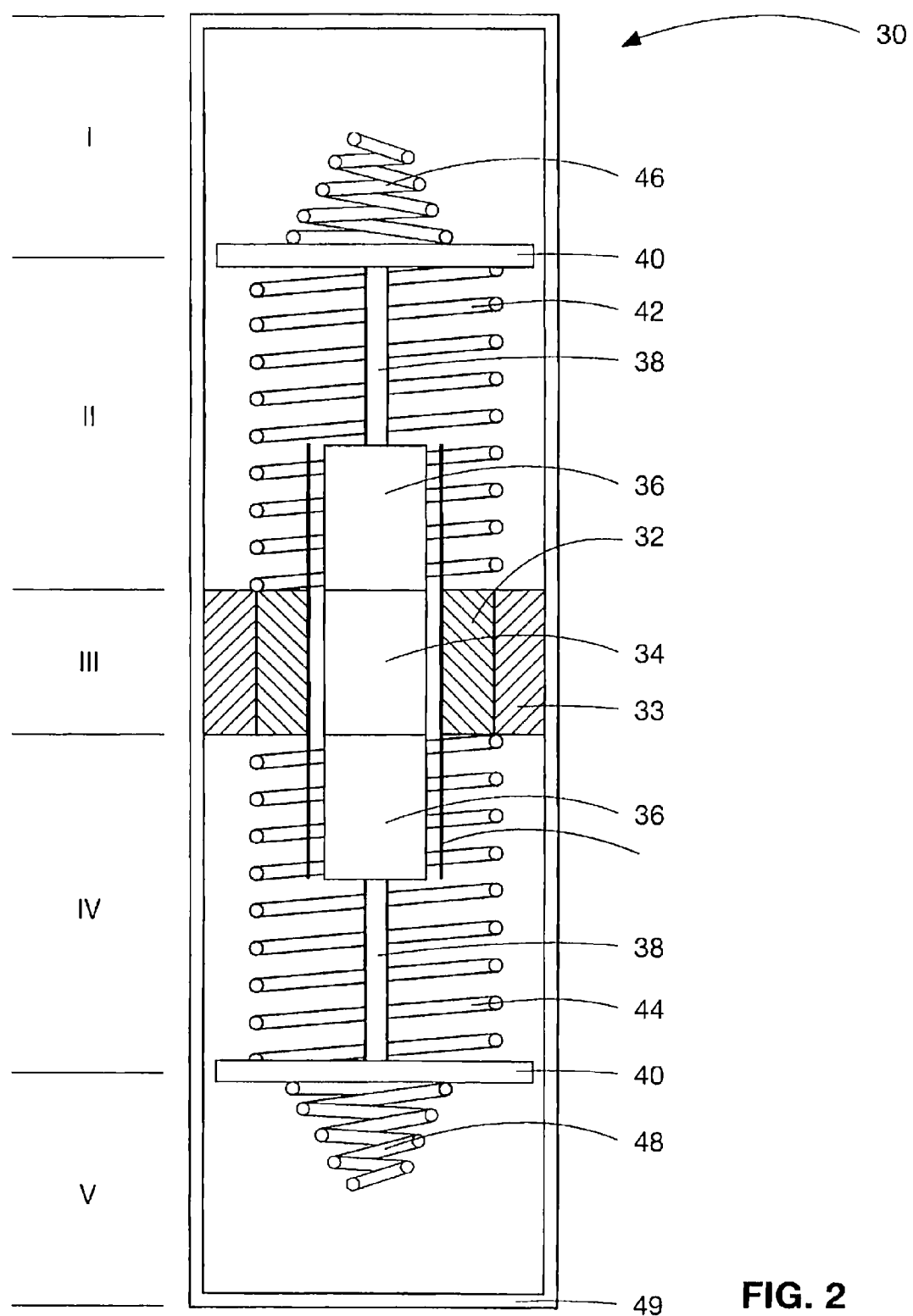
FIG. 2 is a cross-section view of another illustrative embodiment of the electrical energy generator.

As shown in FIG. 2, the device 30, shown at a state of rest, comprises a housing 49 which comprises an elongated circular cross-section tube having first and second ends. The housing 49 comprises an internal cavity defined by the tube and is divided into regions I, II, III, IV, and V. The device 30 further comprises an electromagnetically active mass 34 which is engaged with a body having two shaft portions 38 and two spring stop portions 40. Additional mass 36 may be magnetic or non-magnetic material. The electromagnetically active mass 34 and body form a unitary mass which is moveable within said housing 49. The electromagnetically active mass 34 moves in a reciprocating manner along a path through an induction coil 32, 33 which is positioned about the electromagnetically active mass 34. The device further comprises a first spring 42 having a first end and a second end. Spring 42 comprises a coil spring having the first end engaged with the induction coil 32, 33 and the second end engaged with the spring stop 40. The device further comprises a second spring 44 having a first end and a second end. Spring 44 comprises a coil spring having the first end engaged with induction coil 32, 33 and the second end engaged with the spring stop 40. The device further comprises secondary springs 46, 48 having nonlinear spring coefficients, which are engaged with the spring stops 40, positioned so that, when the device experiences an excessive driving force, the secondary springs 46, 48 will periodically come into contact with ends of the housing 49. Movement of electromagnetically active mass 34 and body relative to the housing 49 causes motion of said spring-stop engaged second end of each spring 42, 44 with respect to said induction coil-engaged first end of each spring 42, 44 such that the motion of the electromagnetically active mass 34 relative to the induction coil 32, 33 results in deflection of the springs 42, 44.

Figure 3:
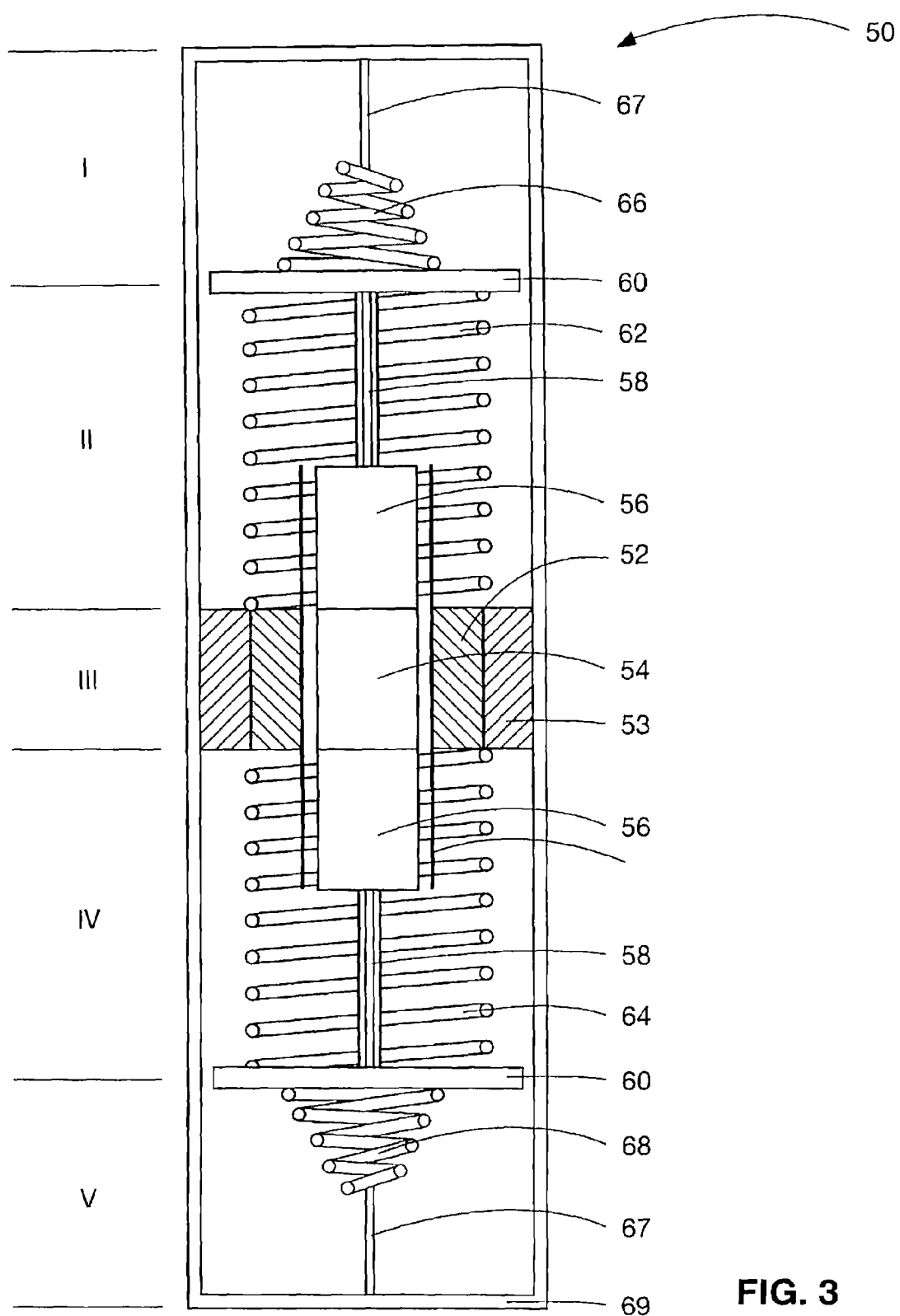
FIG. 3 is a cross-section view of another illustrative embodiment of the electrical energy generator.

As shown in FIG. 3, the device 50, shown at a state of rest, comprises a housing 69 which comprises an elongated circular cross-section tube having first and second ends. The housing 69 comprises an internal cavity defined by the tube and is divided into regions I, II, III, IV, and V. The device 50 further comprises an electromagnetically active mass 54 which is engaged with a body having two shaft portions 58 and two spring stop portions 60. Additional mass 56 may be magnetic or non-magnetic material. The electromagnetically active mass 54 and body form a unitary mass which is moveable within said housing 69. The electromagnetically active mass 54 moves in a reciprocating manner along a path through an induction coil 52, 53 which is positioned about the electromagnetically active mass 54. The device further comprises a first spring 62 having a first end and a second end. Spring 62 comprises a coil spring having the first end engaged with the induction coil 52, 53 and the second end engaged with the spring stop 60. The device further comprises a second spring 64 having a first end and a second end. Spring 64 comprises a coil spring having the first end engaged with induction coil 52, 53 and the second end engaged with the spring stop 60. The device further comprises secondary springs 66, 68 having nonlinear spring coefficients, which are engaged with the spring stops 60, positioned so that, when the device experiences a driving force, the secondary springs 66, 68 will periodically come into contact with the housing 69. The device further comprises a guide rod 67, which extends along the longitudinal axis of housing 69 and passes through the spring stops 60, shaft portions 58, springs 62, 64, 66, 68, and electromagnetically active mass 54. Movement of electromagnetically active mass 54 and body relative to the housing 69 causes motion of said spring-stop engaged second end of each spring 62, 64 with respect to said induction coil-engaged first end of each spring 62, 64 such that the motion of the electromagnetically active mass 54 relative to the induction coil 52, 53 results in deflection of the springs 62, 64.

Figure 4:
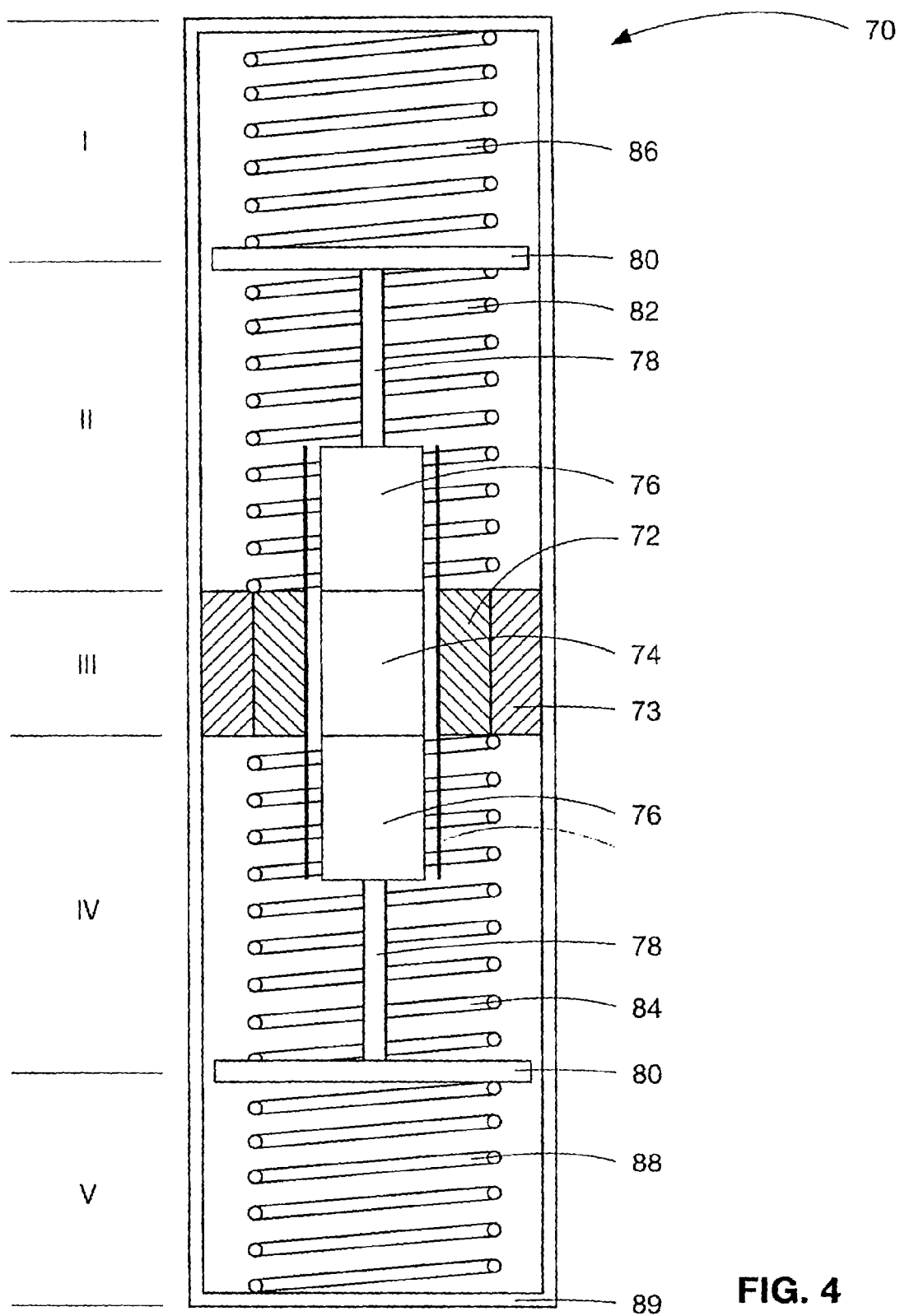
FIG. 4 is a cross-section view of another illustrative embodiment of the electrical energy generator.

As shown in FIG. 4, the device 70, shown at a state of rest, comprises a housing 89 which comprises an elongated circular cross-section tube having first and second ends. The housing 89 comprises an internal cavity defined by the tube and is divided into regions I, II, III, IV, and V. The device 70 further comprises an electromagnetically active mass 74 which is engaged with a body having two shaft portions 78 and two spring stop portions 80. Additional mass 76 may be magnetic or non-magnetic material. The electromagnetically active mass 74 and body form a unitary mass which is moveable within said housing 89. The electromagnetically active mass 74 moves in a reciprocating manner along a path through an induction coil 72, 73 which is positioned about the electromagnetically active mass 74. The device further comprises a first spring 82 having a first end and a second end. Spring 82 comprises a coil spring having the first end engaged with the induction coil 72, 73 and the second end engaged with the spring stop 80. The device further comprises a second spring 84 having a first end and a second end. Spring 84 comprises a coil spring having the first end engaged with induction coil 72, 73 and the second end engaged with the spring stop 80. The device further comprises a third spring 86 having a first end and a second end. Spring 86 comprises a coil spring having the first end engaged with the induction coil 72, 73 and the second end engaged with the first end of the housing 89. The device further comprises a fourth spring 88 having a first end and a second end. Spring 88 comprises a coil spring having the first end engaged with the induction coil 72, 73 and the second end engaged with the second end of the housing 89. Movement of electromagnetically active mass 74 and body relative to the housing 89 causes motion of said springs 82, 84, 86, 88 such that the motion of the electromagnetically active mass 74 relative to the induction coil 72, 73 results in deflection of the springs 82, 84, 86, 88.

Figure 5A:
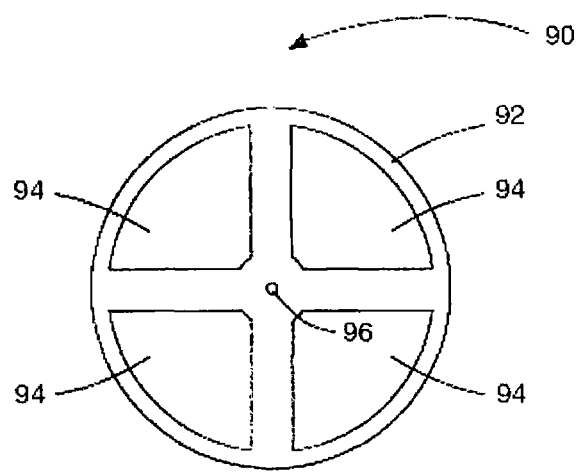
FIG. 5A is a top plan view of an illustrative embodiment of the spring stop portion of the support structure of the electrical energy generator.
Figure 5B:
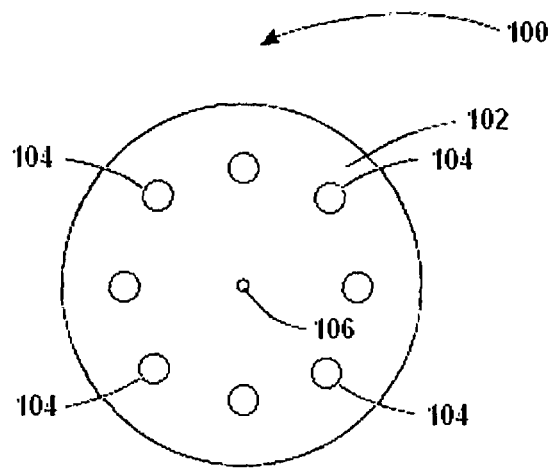
FIG. 5B is a top plan view of another illustrative embodiment of the spring stop portion of the support structure of the electrical energy generator.

An illustrative embodiment of the spring stop is shown in FIG. 5A. Spring stop 90 comprises a modified disc 92 containing voids 94 and an optional center hole 96 for attaching the spring stop 90 onto the body. A further illustrative embodiment of the spring stop is shown in FIG. 5B. Spring stop 100 comprises a modified disc 102 containing voids 104 positioned in a substantially concentric manner inwardly relative to the outer circumference of spring stop 100. Spring stop 100 may also include a substantially centrally positioned hole 106 to accommodate a guide rod or a shaft means for engaging to a mass. Furthermore, spring stop 100 may include any number of holes and such holes may be positioned in any manner. Spring stops 90, 100 constrain the movement of the electromagnetically active mass and body to minimize non-reciprocating motion of the entire mass within the housing, while minimizing motion retardation during movement of the entire mass within the housing.

Figure 6:
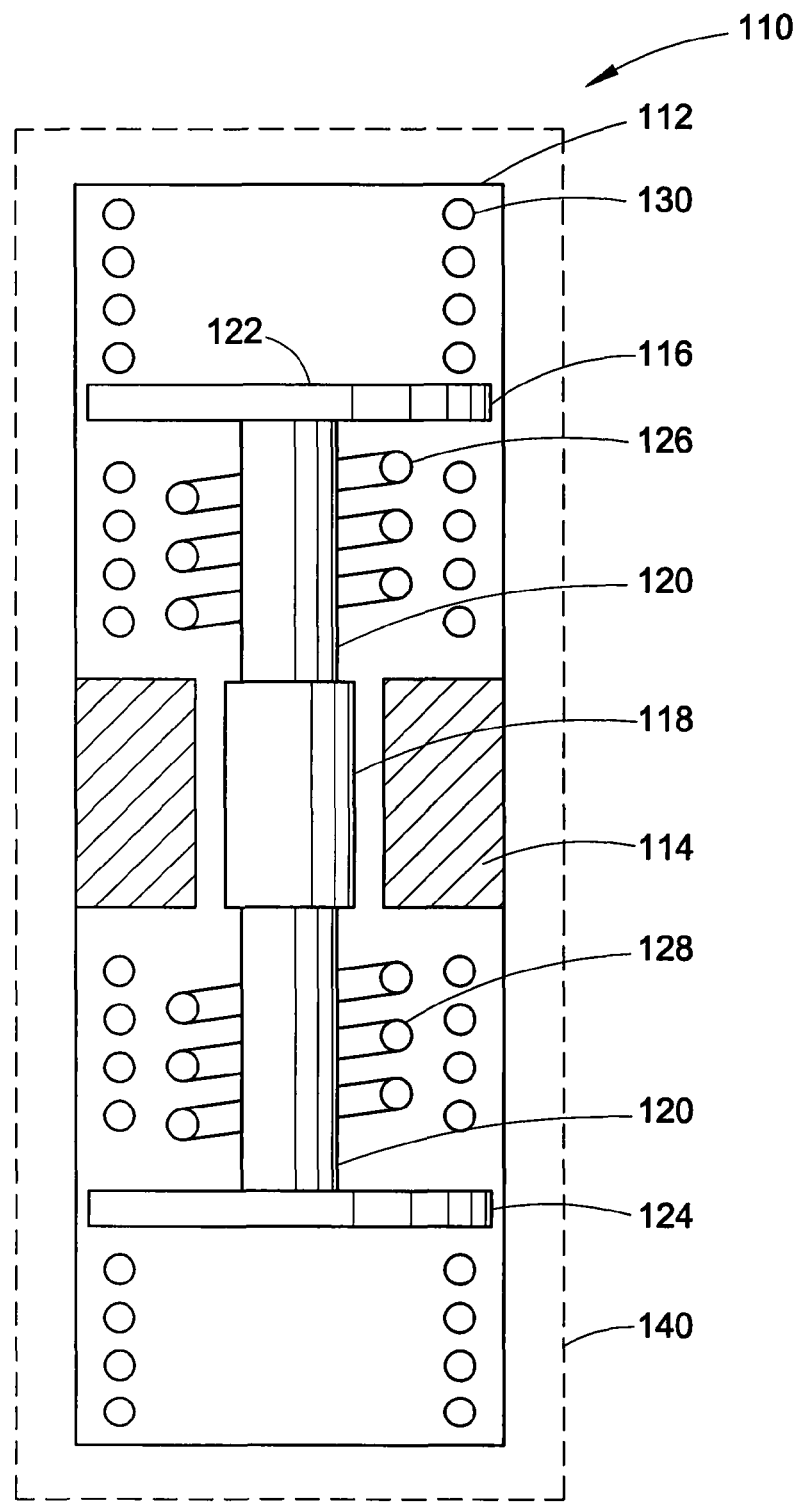
FIG. 6 is an illustrative embodiment of the device having an additional housing.

FIG. 6 shows an embodiment the device 110 having an additional housing. Device 110 includes housing 112. Positioned within housing 112 is induction coil 114. Also positioned within housing 112 is body 116 that is engaged with electromagnetically active mass 118. Body 116 includes elongated shaft 120 and spring stop portions 122, 124. Springs 126, 128 are positioned between the electromagnetically active mass 118 and spring stops 122, 124. The housing 112 includes a plurality of holes 130 communicating from the interior of the housing 112 to the outside of housing 112. Device 110 may also include an additional outer housing 140 that encloses housing 112.

In certain embodiments the mechanical energy harvester is engaged with a worn item or a carried item. Worn items comprise clothing, such as a hat, belt, shirt, pants, dress, skirt, sweater, sweatshirt, jacket and the like. Protective gear, includes without limitation body armor, life vest, personal flotation devices and the like. Carrying items include without limitation backpacks, waist-packs, field-packs, medical packs, bags, tool-bags, book-bags, purses, briefcases, holsters, sheaths and the like.

In embodiments in which the electrical energy generator is engaged with a worn item, the worn item is excited by exciting forces imparted from the wearer, and the electrical energy generator is excited by exciting forces imparted from the worn item. The engagement of the electrical energy generator with the worn item may be firm such that the device is substantially immobile relative to the worn carrying device; flexible or soft such that there is a great deal motion of the device relative to the worn item; or somewhere in between.

Without limitation, an electrical energy generator may be designed for hand-held usage such that the device harvester can be excited by shaking it by hand.

If there is a known frequency source the mass and spring system may be tuned to resonate at this frequency, thereby increasing the amount of mechanical energy in the system resulting in an increase in the output of electrical energy from the system. For purposes of illustration and without limitation, a common excitation frequency for walking is about 2 Hz. This information may be used to predetermine an appropriate natural frequency of the electrical energy generator. Depending upon the embodiment and desired operational characteristics, it may be desirable to have one or more of the natural frequencies of the device similar to one or more of the operational frequencies of the source of the excitation kinetic energy; or dissimilar to one or more of the expected operational frequencies of the source of the excitation kinetic energy by some predetermined amount. In certain embodiments, one natural frequency of the device is predetermined to correspond to the steady state harmonic motion of the gait of the human or animal by which it is carried or worn.

While the electrical energy generator has been described in connection with various illustrative embodiments, as shown in the Figures, it is to be understood that other similar embodiments may be used or modifications and additions may be made to the described embodiments for performing the same functions. Therefore, the electrical energy generator should not be limited to any single embodiment, but rather construed in breadth and scope in accordance with the recitation of the appended claims.

I claim:

1. An electrical energy generator comprising:
a housing having a longitudinal axis and opposite ends;
an electromagnetically active mass positioned within the housing reciprocally movable along at least a portion of the longitudinal axis;
an electrically conductive material positioned within the housing;
a body engaged with the electromagnetically active mass, wherein the body comprises a shaft and spring stops at opposite ends; and
a first spring positioned between a first end of the body and the electrically conductive material and a second spring positioned between a second end of the body and the electrically conductive material.

2. The electrical energy generator of claim 1, wherein the generator comprises a third spring positioned between a first end of the housing and a first end of the body and a fourth spring positioned between a second end of the housing and a second end of the body.

3. The electrical energy generator of claim 1, further comprising at least one secondary spring positioned between an end of the body and an end of the housing, wherein the secondary spring has a nonlinear spring coefficient.

4. The electrical energy generator of claim 2, wherein at least one of the first, second, third, or fourth springs has a nonlinear spring coefficient.

5. The electrical energy generator of claim 1, wherein at least a portion of the shaft of the body comprises a permanent magnet.

6. The electrical energy generator of claim 1, wherein the housing comprises a cylinder or tube.

7. The electrical energy generator of claim 6, wherein the electrically conductive material comprises at least one induction coil.

8. The electrical energy generator of claim 7, wherein said at least one spring comprises a coil spring.

9. The electrical energy generator of claim 8, wherein said at least one coil spring comprises a compression spring.

10. The electrical energy generator of claim 8, wherein said at least one coil spring comprises an extension spring.

11. The electrical energy generator of claim 1, wherein the electromagnetically active mass comprises at least one permanent magnet.

12. The electrical energy generator of claim 1, wherein the spring stops of the body are adapted to constrain the movement of the electromagnetically active mass to minimize or substantially prevent non-reciprocating motion of the electromagnetically active mass within the housing.

13. The electrical energy generator of claim 1, wherein the spring stops of the body are adapted to minimize motion retardation during movement of the electromagnetically active mass and body within the housing.

14. The electrical energy generator of claim 1, wherein the interior of the housing is in communication with the surrounding environment by means of at least one of apertures, holes, vents, slots, or perforations located within the housing.

15. The electrical energy generator of claim 1, wherein the housing comprises a closed structure and an atmosphere within the housing comprises at least one of air, nitrogen, a Nobel gas, mineral oil, vegetable oil, water, saline, partial vacuum, substantial vacuum, a ferrofluid, or combinations thereof.

16. The electrical energy generator of claim 2, wherein the third and fourth springs are pre-compressed within the housing.

17. The electrical energy generator of claim 2, wherein the third and fourth springs are pre-extended within the housing.

18. The electrical energy generator of claim 1, wherein the first and second springs are pre-compressed within the housing.

19. The electrical energy generator of claim 1, wherein the first and second springs are pre-extended within the housing.

20. The electrical energy generator of claim 2, wherein the first, second, third and fourth springs are pre-compressed within the housing.

21. The electrical energy generator of claim 2, wherein the first, second, third and fourth springs are pre-extended within the housing.

22. The electrical energy generator of claim 1, further comprising a guide to minimize or substantially prevent the non-reciprocating motion of said electromagnetically active mass within said housing.

23. The electrical energy generator of claim 22, wherein the guide comprises a rod which passes through the center of the electromagnetically active mass and is engaged with the ends of the housing.

24. The electrical energy generator of claim 1, further comprising at least one means for adjusting the deflection of the at least one spring.

* * * * *